United States Patent Office 3,468,929
Patented Sept. 23, 1969

3,468,929
CYCLENE-CARBOXYLATES AND
PREPARATION THEREOF
Yannik Bonnet, Tassin-la-Demi-Lune, France, assignor to
Rhone-Poulenc S.A., Paris, France, a French body
corporate
No Drawing. Filed May 6, 1966, Ser. No. 548,039
Claims priority, application France, May 10, 1965,
16,474
Int. Cl. C07c *61/32, 69/74, 67/00*
U.S. Cl. 260—468                              10 Claims

ABSTRACT OF THE DISCLOSURE

Alkyl 2-alkoxy-2-cyclene-carboxylates, useful as intermediates in the production of cycloalkanones, are made by reacting an $\alpha,\alpha,\omega$-trihalogenocycloalkanone with an alkali metal alkoxide.

---

The present invention relates to intermediates useful in the preparation of cyclic ketones having 8 to 15 carbon atoms in the ring.

Some medium- or large-sized ring cyclic ketones such as cyclooctanone and cyclododecanone are quite readily obtainable; but others e.g. cycloundecanone and cyclopentadecanone (exaltone) which are useful in the synthesis of polyamides and in perfumery are less readily available. A method of producing medium- or large-sized ring cyclic ketones by ring contraction from ketones containing one more carbon atom in the ring is therefore desirable to provide means for producing less readily available ketones from more readily available ones.

It has now been found that when an $\alpha,\alpha,\omega$-trihalogenocycloalkanone having at least 9 carbon atoms in the ring is treated with an alkali metal alkoxide in an anhydrous alcohol an alkyl 2-alkoxy-2-cyclene-carboxylate having one fewer carbon atoms in the ring is obtained. This ring contraction affords a means whereby it is possible to produce a cyclic ketone from another cyclic ketone containing one more ring carbon atom, using the additional process steps set out below.

Accordingly the present invention provides a process for the preparation of alkyl 2-alkoxy-2-cyclene-carboxylates of the formula:

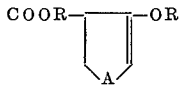

in which R is an alkyl radical of 1 to 4 carbon atoms and A is an alkylene radical of 4 to 11 carbon atoms which comprises reacting an $\alpha,\alpha,\omega$-trihalogenocycloalkanone of the formula:

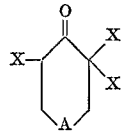

in which X is a halogen atom and A is as hereinbefore defined with an alkali metal alkoxide of 1 to 4 carbon atoms in an anhydrous alkanol at an elevated temperature.

The process may be represented by the following reaction:

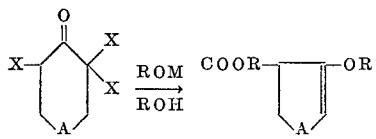

in which R and A are as hereinbefore defined, M is an alkali metal such as sodium, potassium or lithium and X is a halogen atom such as chlorine or bromine.

The starting material may be prepared by halogenating the corresponding cyclic ketones such as cyclononanone, cyclodecanone, cycloundecanone, cyclododecanone or cyclohexadecanone. This may be effected either by the action of a halogen in the cold on the cycloalkanone in carbon tetrachlroide solution or by the action of a halogen at an elevated temperature on the cycloalkanone in solution in a lower aliphatic acid solution such as acetic acid solution.

The process of the invention is carried out by treating the $\alpha,\alpha,\omega$-trihalogenocycloalkanone with an alkali metal alkoxide in an anhydrous lower alkanol. Preferably the alkali metal alkoxide is sodium or potassium methoxide or ethoxide. It is preferable for the alcohol employed to be the same as that which has served for the preparation of the alkoxide. Suitable alcohols include methanol, ethanol and propanol. The quantity of alkoxide used may be approximately the theoretical quantity necessary for effecting the dehydrohalogenation of the trihalogenocycloalkanone, i.e. 3 mol of alkoxide per mol of ketone, but is preferably between 4.1 and 6 mols per mol of ketone.

The temperature for the reaction may be from, e.g. 20° C. to 150° C., but is preferably the reflux temperature of the reaction mixture. The reaction is complete when the halide corresponding to the alkoxide used ceases to be produced.

The alkyl 2-alkoxy-2-cyclene-carboxylates produced in accordance with the invention can be converted into the corresponding ketones according to the following reaction scheme:

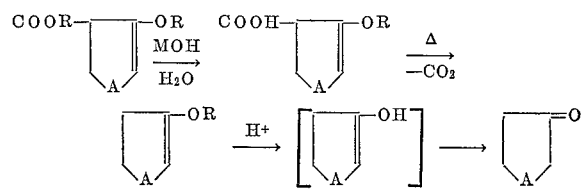

in which R, M and A are as hereinbefore defined.

The alkyl 2-alkoxy-2-cyclene carboxylate may be saponified by an alkaline base. If an excess of alkali metal alkoxide is used in the process of the invention, e.g. the 4.1 to 6 mols per mol of halogenocycloalkanone already mentioned, it is possible to effect the saponification by simple addition of water to the reaction mixture.

Thus, although the alkyl 2-alkoxy-2-cyclene-carboxylate can be isolated as such, when it is to be converted into the ketone as outlined above, it is preferable to convert it directly into the corresponding acid which is then subjected to the remaining steps of the process. The alkaline base may be sodium or potassium hydroxide in an aqueous alcoholic medium. The quantity of base employed may vary between 1.1 and 3 mol of alkali metal hydroxide per mol of ester. The saponification temperature depends upon the ester; generally the operation can be carried out at the reflux temperature of the reactants. The alkali metal salt of the alkoxy acid corresponding to the ester is thus obtained. The reaction medium can be acidified to liberate the acid and then treated with ether to extract the latter. After evaporation of the ether, the alkoxy-acid is obtained as an oil.

This acid may then be decarboxylated by simple heating in a nitrogen atmosphere to give the 1-alkoxy cyclene as an oil. The temperature employed depends upon the starting acid; it is generally between 100° and 150° C. This oil is then hydrolysed in an aqueous organic medium in the presence of a strong acid, such as hydrochloric acid or sulphuric acid, as a catalyst. The organic diluent added to increase the homogeneity of the medium may be a lower alcohol such as methanol or ethanol or an ether such as diethyl ether or dioxan. The hydrolysis may be carried out at ambient temperature or above. At the end of the reaction, the solution of cycloalkanone is collected in the organic phase and the ketone isolated by the usual procedures.

The cycloalkanone may be obtained, using the process of the invention, in yields which vary from 69% to 74% based on the original ketone containing one more carbon atom in the ring.

In the following examples, parts 2(a) illustrate the preparation of alkyl 2-alkoxy-2-cyclene-carboxylates and the complete examples illustrate the use of the process of the invention in converting a cyclic ketone into a cyclic ketone containing one less carbon atom in the ring. All the products were identified by infra-red spectrography.

EXAMPLE 1.—PREPARATION OF CYCLODECANONE (1) Preparation of 2,2,11-tribromocycloundecanone 50 g. (0.298 mol.) of cycloundecanone and 100 g. of anhydrous carbon tetrachloride were introduced into a three-necked round-bottomed 500 cc. flask fitted with a stirrer, a reflux condenser, a dropping funnel and a thermometer. This solution was stirred with cooling to 0–5° C. Then 144.5 g. of anhydrous bromine in 62.5 g. of carbon tetrachloride were added in one hour. The mixture was maintained at 0–5° C. for 8 hours and then allowed to return to ambient temperature. The stirring was continued for 15 hours at this temperature. A white solid precipitated which was separated by filtration and washed with 30 cc. of carbon tetrachloride at 0° C. After drying, 111.8 g. of solid matter, M.P. 74–80° C. (82–83° C. after recrystallisation from a mixture of diethyl ether and pentane), identified by IR spectrography as 2,2,11-tribromo-cycloundecanone (yield 92.7% of crude product), were collected.

(2) Preparation of 2-methoxy-cyclodec-2-ene-carboxylic acid (a) 910 cc. of anhydrous methanol containing 35.4 g. of dissolved sodium (1.54 mol) were introduced into a 2000 cc. three-necked round-bottomed flask equipped as in part (1). 111.5 g. (0.257 mol) of 2,2,11-tribromocyclo-undecanone were then added with stirring, and the mixture refluxed for 48 hours.

(b) 450 cc. of methanol were distilled off and the product was cooled to 20° C. and 450 cc. of water added. The whole was refluxed with stirring for 25 hours. The product was allowed to stand for 47 hours at ambient temperature to complete the saponification of the methyl 2-methoxy-cyclodec-2-ene-carboxylate. The alcohol was then distilled off in vacuo, and the residue taken up in 200 cc. of diethyl ether to extract the unsaponified neutral portion. After decantation, the alkaline aqueous layer was acidified with 300 cc. of 3 N hydrochloric acid in the presence of 100 cc. of diethyl ether to liberate the 2-methoxy-cyclodec-2-ene-carboxylic acid. The ethereal layer was decanted, washed with 3×50 cc. of distilled water and dried over anhydrous $Na_2SO_4$. After evaporation, 55.3 g. of a solid white product, M.P. 99–104° C., identified by IR spectrography as 2-methoxy-cyclodec-2-ene-carboxylic acid were obtained. After recrystallisation from a mixture of diethyl ether and pentane, the melting point was 113–114° C.

(3) Decarboxylation 55.3 g. of 2-methoxy-cyclodec-2-ene-carboxylic acid were introduced into a 250 cc. round-bottomed flask equipped with a reflux condenser, a thermometer, a nitrogen inlet, a stirrer and a heating device, and the flask was purged with nitrogen and then gradually heated to 130° C. and maintained at this temperature for 2 hours. After cooling, the contents of the flask were extracted with 200 cc. of diethyl ether. The ethereal layer was twice treated with 40 cc. of 3% by weight sodium hydroxide and then washed to neutrality with 3×100 cc. of water and dried over anhydrous $Na_2SO_4$. After evaporation of the solvent, 39.85 g. of an orange-yellow mobile oil were collected containing at least 90% of 1-methoxycyclodecene (35.86 g.) and 10% of cyclodecanone.

(4) Hydrolysis

The oil obtained above (39.85 g.), 280 cc. of methanol and 30 cc. of 3 N hydrochloric acid were introduced into a round-bottomed flask provided with a reflux condenser. The temperature was raised to 60° C. over one hour and maintained at this temperature for a further hour. The methanol was then distilled off in vacuo. The heterogeneous liquid was extracted with 150 cc. of diethyl ether and the ethereal layer washed to neutrality with water and then dried over anhydrous $Na_2SO_4$. After evaporation of the solvent, 35.6 g. of yellow oil were collected which after distillation, gave 33.8 g. of a colourless oil, B.P.= 97.5–98.5° C./9–10 mm. Hg, and B.P.=100–102° C./11 mm. Hg. This product was identified as cyclodecanone. Yield=74% calculated on the cycloundecanone. The melting point of the 2,4-dinitrophenylhydrazone was 161° C.

EXAMPLE 2.—PREPARATION OF CYCLONONANONE (1) Preparation of 2,2,10-tribromocyclodecanone Following the procedure of Example 1, 2,2,10-tribromo-cyclodecanone was prepared from 33 g. (0.214 mol) of cyclodecanone and 103.7 g. of anhydrous bromine (1.29 mol). 83.8 g. of a pale yellow solid, M.P. 58–62° C., identified as 2,2,10-tribromocyclodecanone were obtained having a melting point of 67–68° C. after recrystallisation from a mixture of diethyl ether and pentane.

(2) Preparation of 2-methoxy-cyclonon-2-ene-carboxylic acid (a) 83.4 g. (0.213 mol) of 2,2,10-tribromocyclodeca-none were treated as in Example 1 with sodium methoxide obtained by dissolving 29.4 g. of sodium (1.28 g. atom) in 710 cc. of anhydrous methanol.

(b) The product was then dehydrobrominated to form methyl 2-methoxycyclonon-2-ene-carboxylate. 355 cc. of methanol were distilled off and replaced by the same volume of water. After heating for 25 hours under reflux, the product was left at ambient temperature for 16 hours to effect the saponification of the ester. The reaction mass was reated as in Example 1 and 41.2 g. of a maroon oil identified as 2-methoxy-cyclonon-2-ene carboxylic acid were collected.

(3) Decarboxylation of 2-methoxy-cyclonon-2-ene-carboxylic acid

The oil obtained in the preceding step was heated at 120–130° C. under nitrogen for two hours, after which the reaction mass was treated as in Example 1, to give 27.2 g. of a maroon oil consisting of 1-methoxy-cyclo-nonene containing a little cyclononanone.

(4) Hydrolysis 1-methoxy-cyclononene was hydrolysed as in Example 1 by treating the above oil (27.2 g.) with 21 cc. of 3 N hydrochloric acid in 200 cc. of methanol. Treatment of the reaction mass produced 23.6 g. of a maroon oil which, on distillation, gave 21.7 g. of a fraction having a boiling point of 95–96° C./13–14 mm. Hg and 97–98° C./15 mm. Hg, identified as cyclononanone. Yield=72.6% calculated on the cyclodecanone. The melting point of the 2,4-dinitrophenylhydrazone was 139.5° C.

EXAMPLE 3.—PREPARATION OF CYCLOOCTANONE

(1) Preparation of 2,2,9-tribromocyclononanone

The operation was carried out with the following reactants and proportions:

cyclononanone=22 g. (0.157 mol), anhydrous $CCl_4$=44 g. and anhydrous bromine=76.2 g. (0.47 mol).

After the usual treatments, 58.8 g. of a yellowish-white solid melting at 86–89° C. (yield 99.4% were obtained). On recrystallisation from a mixture of diethyl ether and pentane the melting point rose to 89–90° C. This product was identified as 2,2,9-tribromocyclononanone.

(2) Preparation of 2-methoxy-cyclooct-2-ene-carboxylic acid (a) 55 g. (0.146 mol) of 2,2,9-tribromocyclononanone were refluxed for 48 hours with 20.7 g. (0.9 g. atom) of sodium in 520 cc. of anhydrous methanol.

(b) 260 cc. of methanol were distilled off and replaced by distilled water, and the mixture heated under reflux for 25 hours to saponify the methyl 2-methoxy-cyclooct-2-ene-carboxylate. 2-methoxy-cyclooct-2-ene-carboxylic acid was liberated by acidification and isolated in the usual way. 24.9 g. of a maroon oil which was identified as 2-methoxy-cyclooct-2-ene-carboxylic acid was obtained.

(3) Decarboxylation 24.6 g. of 2-methoxy-cyclooct-2-ene-carboxylic acid were heated for 2 hours at 120–130° C. under nitrogen. After the usual treatments, 17.4 g. of an oil consisting of 1-methoxy-cyclooctene containing a little cyclooctanone were obtained.

(4) Hydrolysis 16.8 g. of the oil previously obtained were treated with 13 cc. of 3 N hydrochloric acid in 125 cc. of methanol, the operation being carried out as in Example 1. After the usual treatments, 14.05 g. of an oil which crystallised were collected. On distillation, 12.9 g. of a fraction, B.P.=80–81° C./14 mm. Hg (solidification point 43.2° C.) were obtained. Yield=73% calculated on the cyclononanone. The IR spectrum was the same as that of cyclooctanone.

EXAMPLE 4.—PREPARATION OF CYCLOUNDECANONE

(1) Preparation of 2,2,12-tribromocyclododecanone

The procedure of Example 1 was followed with the following reactants and proportions:

cyclododecanone=4 g. (0.022 mol), anhydrous $CCl_4$=13 g., anhydrous bromine=10.7 g. (0.066 mol).

After the usual treatments, 8.4 g. of a white solid, M.P. 104.5–105° C., identified as 2,2,12-tribromocyclododecanone (yield 91.1%) were isolated.

(2) Preparation of 2-methoxy-cycloundec-2-ene-carboxylic acid (a) 41.9 g. (0.1 mol) of 2,2,12-tribromocyclododecanone were converted into methyl 2-methoxy-cycloundec-2-ene-carboxylate by heating under reflux in 330 cc. of methanol containing 13.8 g. of sodium (0.6 g. atom).

(b) 170 cc. of methanol were distilled off and replaced by distilled water and the mixture heated under reflux to saponify the ester. The acid was liberated by acidification and recovered by the usual treatments to give 22.25 g. of an oily acid identified as 2-methoxycycloundec-2-ene-carboxylic acid. After recrystallisation from a mixture of diethyl ether and pentane, the product had a melting point of 102° C.

(3) Decarboxylation

The previously obtained acid (22.25 g.) was heated for 2 hours at 120–130° C. under nitrogen and, after the usual treatments, gave 14.4 g. of a yellow mobile oil consisting of 1-methoxy-cycloundecene containing a little cycloundecanone.

(4) Hydrolysis

The oil previously obtained (14.4 g.) was treated with 10 cc. of 3 N hydrochloric acid in 100 cc. of methanol. After the usual treatments, 13.4 g. of an oil which, on distillation, gave 12.8 g. of colourless fraction, B.P. 62–63° C./0.1 mm. Hg, a solidfication point 16–16.5° C. were obtained. Yield=69.4% calculated on the cyclododecanone. The melting point of the 2,4-dinitrophenylhydrazone was 149.5° C.

I claim:

1. A process for the preparation of alkyl 2-alkoxy-2-cyclene-carboxylates of the formula:

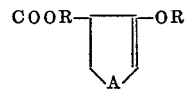

in which R is an alkyl radical of 1 to 4 carbon atoms and A is an alkylene radical of 4 to 11 carbon atoms which comprises reacting an α,α,ω-trihalogenocycloalkanone of the formula:

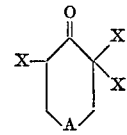

in which X is a halogen atom and A is as hereinbefore defined with an alkali metal alkoxide of 1 to 4 carbon atoms in an anhydrous alkanol at 20° C. to 150° C.

2. A process according to claim 1 in which the alkali metal alkoxide is sodium or potassium methoxide or ethoxide.

3. A process according to claim 1 in which the alkanol is the same as that used for the preparation of the alkoxide.

4. A process according to claim 1 in which at least 3 mols of alkali metal alkoxide are used per mol of trihalogenocycloalkanone.

5. A process according to claim 4 in which between 4.1 and 6 mols of alkali metal alkoxide are used per mol of trihalogeno-cycloalkanone.

6. Alkyl 2-alkoxy-2-cyclene-carboxylates and their acids of the formula:

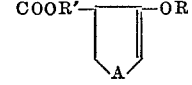

in which R is an alkyl radical of 1 to 4 carbon atoms, R' is the same as R or a hydrogen atom, and A is an alkylene radical of 4 to 11 carbon atoms.

7. Alkyl 2-alkoxy-2-cyclene-carboxylates as claimed in claim 6 in which R is a methyl radical, R' is a methyl radical or a hydrogen atom, and A is an alkylene radical of 6 carbon atoms.

8. Alkyl 2-alkoxy-2-cyclene-carboxylates as claimed in claim 6 in which R is a methyl radical, R' is a methyl radical or a hydrogen atom and A is an alkylene radical of 5 carbon atoms.

9. Alkyl 2-alkoxy-2-cyclene-carboxylates as claimed in claim 6 in which R is a methyl radical, R' is a methyl radical or a hydrogen atom and A is an alkylene radical of 4 carbon atoms.

10. Alkyl 2-alkoxy-2-cyclene-carboxylates as claimed in claim 6 in which R is a methyl radical, R' is a methyl radical or a hydrogen atom and A is an alkylene radical of 7 carbon atoms.

(References on following page)

References Cited

UNITED STATES PATENTS 3,201,397  8/1965  Brannock _____ 260—247.2

OTHER REFERENCES

Favorskii, Al, et al., J. Russ. Phys. Chem. Soc. 46, 1097 (1914).

LORRAINE A. WEINBERGER, Primary Examiner

P. J. KILLOS, Assistant Examiner

U.S. Cl. X.R.

252—522; 260—586, 611, 617